United States Patent Office 3,448,070
Patented June 3, 1969

3,448,070
METHOD FOR PREPARING TRIOXANE-STYRENE AND/OR NORBORNYLENE COPOLYMERS AND STABILIZATION THEREOF
Kazuo Nakatsuka, Fumio Ide, and Masayoshi Takamura, Ohtake-shi, Japan, assignors to Mitsubishi Rayon Co., Ltd., Tokyo, Japan, a corporation of Japan
No Drawing. Filed Dec. 23, 1966, Ser. No. 604,167
Claims priority, application Japan, Dec. 28, 1965, 40/80,548
Int. Cl. C08g $1/20$, $1/18$
U.S. Cl. 260—33.4
16 Claims

ABSTRACT OF THE DISCLOSURE

Trioxane can be copolymerized with styrene or norbornylene by a catalyst of copper tetrafluoroborate, magnesium tetrafluoroborate, zinc tetrafluoroborate, cadmium tetrafluoroborate, tin tetrafluoroborate, lead tetrafluoroborate, copper hexafluorosilicate, magnesium hexafluorosilicate, zinc hexafluorosilicate, cadmium hexafluorosilicate, tin hexafluorosilicate and lead hexafluorosilicate, and these copolymers can be stabilized by adding a neutral amino acid such as glycine, $\alpha$-alanine, $\beta$-alanine and sarcosine and heating above the copolymer's melting point.

The present invention relates to a method for preparing copolymer of trioxane with styrene and/or norbornylene and to a method for stabilizing thus prepared copolymer.

Hitherto, high molecular weight polyoxymethylene obtained by the polymerization of trioxane has been known to be of use for various purposes such as, for example, molding articles, fiber and film, provided subjecting to an appropriate stabilization means, e.g., esterification or etherification of th eend groups, addition of stabilizer or the like. However, such a polyoxymethylene has in general a very poor processability because of its higher crystallinity and even the esterification or etherification of the end group or stabilizer addition can not produce satisfactory thermal stability thereupon. For the purposes of overcoming the aforesaid drawbacks, various attempts have been conducted including copolymerizing trioxane with various comonomer such as styrene. However, the copolymerization proceeds rather slow as compared with the case of homo-polymerization and gives a product of lower degree of polymerization. Therefore, even if a suitable copolymerizable comonomer with trioxane is found out, it is still required to discover a suitable catalyst for the copolymerization of trioxane with the above comonomers. Accordingly, it is a principal object of the present invention to provide a method for preparing trioxane copolymer having improved physical properties.

It is another object of the invention to provide a novel trioxane copolymer having improved processability and excellent thermal stability.

It is another object of the invention to provide a method for preparing the polymeric material having improved characteristic which is useful for making molding article, fiber and film from the copolymer of trioxane with styrene and/or norbornylene.

It is another object of the invention to provide an effective catalyst for the copolymerization of trioxane with styrene and/or norbornylene.

It is still another object of the invention to provide an effective co-catalyst for the co-polymerization of trioxane with styrene and/or norbornylene.

It is an additional object of the invention to provide an effective combination of catalysts for the copolymerization of trioxane with styrene and/or norbornylene.

It is still another object of the invention to provide a method for stabilizing thus prepared copolymer of trioxane with styrene and/or norbornylene.

Other objects of the invention will become apparent from an explanation of the specification and claims which follow.

In accordance with this invention, it has been found that fluoroborate and fluorosilicate are particularly effective catalyst for the copolymerization of trioxane with styrene and/or norbornylene. The present invention is characterized by that the copolymerization of trioxane with styrene and/or norbornylene is carried out in the presence of at least one catalyst selected from the group consisting of Cu, Mg, Zn, Cd, Sn and Pb salts of tetrahydrofluoroboric acid and of hexa-hydrofluorosilicic acid, if desired together with co-catalyst, and that thus prepared copolymer is stabilized as hereinafter described.

Among the catalysts mentioned above, copper tetrafluoroborate, magnesium tetrafluoroborate, zinc tetrafluoroborate, cadmium tetrafluoroborate, tin tetrafluoroborate, lead tetrafluoroborate, copper hexafluorosilicate, tin hexafluorosilicate, or lead hexafluorosilicate can be used in the form of either hexahydrate crystal or more than 40% aqueous solution. Other member such as magnesium hexafluorosilicate, zinc hexafluorosilicate and cadmium hexafluorosilicate is preferably employed in the form of hexahydrate crystal. It is quite surprising that the said metal salts are effective as a cationic polymerization catalyst even in the form of crystal having crystal water or in the form of aqueous solution, and that they have no polymerization ability of only styrene or norbornylene. As for the amount of catalyst employed in this invention, it is adequately determined in a range of 0.001–1%, by weight of the total monomers employed.

For the purpose of further increasing the polymerization velocity and polymerization yield, it is recommended that triphenyl monochloromethane or diphenyl dichloromethane be added to the polymerization system as a co-catalyst. In this case, the co-catalyst is generally used in an amount of 0.1–10 times as much the catalyst, though the actual amount may vary with the particular catalyst employed. As for the amount of styrene and/or norbornylene to be polymerized with trioxane, it is properly determined in a range of 0.1–5 mol percent based on the total monomers. In carrying out the present method, either the so-called bulk polymerization process or the suspension polymerization process may be employed. Generally, in the so-called bulk polymerization reaction, BF₃ etherate or the like can not be used since the catalytic activity of the compound is too strong to carry out the reaction smoothly and local polymerization may occur before it is thoroughly dispersed in the reaction system. On the contrary, each of the catalysts employed in the present invention possesses an adequate catalytic activity for carrying out smooth bulk polymerization reaction. When the suspension polymerization process is employed, it is advantageous to utilize a saturated aliphatic hydrocarbon having more than 21 carbon atoms as a suspension medium, the amount of the medium being chosen in a range of 0.5–5 times, by weight, the total amount of monomer mixture.

As for the polymerization temperature, it is properly determined in a range of between the melting point and the boiling point of trioxane, and however preferable range is from 65° to 90° C. since a higher temperature may give a decreased degree of polymerization.

The thermal stability of thus prepared copolymer can be increased by using the following alternative method. That is, the copolymer is subjected to acetylation by acetic anhydride in the presence of sodium acetate or the copolymer is added with 0.1–3%, by weight, of neutral amino acid and heated at a temperature of higher than the melting point of the copolymer for 1–60 minutes. In this case, the neutral amino acid is selected from the group consisting of glycine, α-alanine, β-alanine and sarcosine. In mixing the neutral amino acid and copolymer, they are directly combined together in each powder form, or they are mixed in ethylene glycol heated at 120°–140° C., because this particular solvent can dissolve the neutral amino acid and at the same time can smell the copolymer.

Thus stabilized copolymer is, if desired, after adding other additives such as thermal stabilizer, light stabilizer and the like, processed to make molding articles, fiber, film and the like.

In order to disclose the nature of the present invention still more clearly, the following illustrative examples will be given. It is to be understood that the invention is not to be limited to the specific conditions or details set forth in these examples except insofar as such limitations are specified in the appended claims.

Parts used in the examples are parts by weight. The intrinsic viscosity $[\eta]$ is measured at 60° C. by employing the solution of copolymer in p-chlorophenol containing 2 wt. percent pinene (0.5 gram copolymer per 100 cc. of the solvent). As a measure of indicating the thermal stability of the present copolymer, the rate of thermal decomposition of the compound in silicone oil at 222° C. is employed ($K_{222}$:percent/min.).

Example 1

Trioxane can successfully be copolymerized with styrene by the catalytic action of metal tetrafluoroborate having crystal water.

To illustrate, 39.2 parts of trioxane (recrystallized from chloroform) and 0.8 part of styrene were added with 0.005 part of cadmium tetrafluoroborate hexahydrate as a catalyst, and the mixture was continued stirring at 80° C. Upon stirring, the trioxan began to melt and the polymerization started. After 12 minutes from the start of said stirring, the reaction system lost fluidity and solidified. The mixture was kept at 80° C. for another 168 minutes, and thereafter thus produced solid mass was pulverized in ammoniac methanol, washed with acetone and dried in vacuum. 33.4 parts of polymerization product, (intrinsic viscosity $[\eta]$ 1.70), were obtained.

In the infra-red absorption spectrum, there found a strong absorption at 700 cm.$^{-1}$, which was the indication of having styrene moiety in the product.

Example 2

Copolymer of trioxane with styrene was prepared by the method of Example 1 except that 0.01 part of triphenyl monochloromethane was further added as a cocatalyst. 38.2 parts of the copolymer, ($[\eta]$ 1.64), were obtained. Styrene content of the copolymer was found to be 1.4% by weight.

Example 3

To a mixture of 39.8 parts of trioxane and 0.2 part of norbornylene, 0.04 part of cadmium tetrafluoroborate hexahydrate and 0.02 part of triphenyl monochloromethane were added and the mixture was stirred at 80° C. After 2.5 hours, the reaction mixture was solidified, and the solidified mass was further maintained at the same temperature for 2.5 hours. 34.7 parts of the copolymer were obtained, the polymerization yield being 86.8% and the intrinsic viscosity $[\eta]$ being 1.45.

Example 4

To a mixture of 39.4 parts of trioxane, 0.4 part of styrene and 0.2 part of norbornylene, 0.01 part of cadmium tetrafluoroborate hexahydrate and 0.03 part of triphenyl monochloromethane were added and the mixture was reacted at 80° C. for 5 hours. 36.0 parts of the copolymer were obtained, the yield being 90.0%. The intrinsic viscosity $[\eta]$ of the product was 1.50.

Example 5

To a mixture of 39.3 parts of trioxane and 0.7 part of norbornylene, 0.15 part of finely pulverized (finer than 50 mesh) magnesium hexafluorosilicate hexahydrate was added and the mixture was reacted at 80° C. for 7 hours. 22 parts of the product were obtained. The intrinsic viscosity $[\eta]$ and the rate of thermal decomposition $[K_{222}]$ of the product were 1.32 and 0.4%/min., respectively. This product was acetylated with acetic anhydride in the presence of sodium acetate at 138° C. for 3 hours, and thus acetylated product was found to be of great stability for thermal decomposition, the $K_{222}$ value being substantially zero percent/min.

Example 6

To a mixture of 19 parts of trioxane and 1 part of styrene, 0.002 part of lead tetrafluoroborate hexahydrate was added and the mixture was continued stirring at 65° C. After 25 minutes, the reaction mixture was solidified and thereafter the mixture was maintained at 65° C. for another 7 hours. 16.6 parts of the copolymer were obtained, whose intrinsic viscosity $[\eta]$ and the rate of thermal decomposition $[K_{222}]$ were 0.84 and 0.7%/min., respectively.

Example 7

19 parts of trioxane and 1 part of styrene were reacted in the presence of 0.005 part of 45% aqueous copper tetrafluoroborate solution at 65° C. After 18 minutes from the start of stirring, the reaction mixture was solidified and then the mixture was maintained at 65° C. for another 4 hours. 18.8 parts of the copolymer were obtained, whose intrinsic viscosity $[\eta]$ was 0.46.

Example 8

To a mixture of 19 parts of trioxane and 1 part of styrene, 0.005 part of 45% aqueous tin tetrafluoroborate solution was added and the mixture was stirred at 65° C. After 15 minutes, the mixture was solidified. Thereafter, the solidified mass was maintained at 65° C. for another 4 hours. Thus, 18.7 parts of the copolymer were obtained, whose intrinsic viscosity $[\eta]$ was found to be 0.59.

Example 9

To a mixture of 19.9 parts of trioxane, 0.1 part of norbornylene and 0.01 part of styrene, 0.04 part of 80% aqueous tin hexafluorosilicate solution was added and the mixture was stirred at 65° C. By reacting the mixture for 8 hours, 14.5 parts of the copolymer were obtained, whose intrinsic viscosity was found to be 1.53.

Example 10

To a mixture of 39.6 parts of trioxane and 0.4 part of norbornylene, 0.1 part of magnesium hexafluorosilicate hexahydrate was added and the mixture was stirred at 80° C. The reaction mixture was solidified after 131 minutes from the start of said stirring, and thereafter the solidified mass was maintained at 80° C. for another 169 minutes. By this procedure, 23.8 parts of the copolymer (yield:59.5%) were obtained, whose intrinsic viscosity $[\eta]$ was 1.66.

Example 11

The same procedures as described in Example 10 were repeated except that the reaction mixture was further added with 0.008 part of diphenyldichloromethane. The time necessitated for solidifying the reaction mixture was 66 minutes. 26.3 parts of the copolymer (yield: 65.8%) were obtained, whose intrinsic viscosity $[\eta]$ was 1.53.

Example 12

To a mixture of 39.2 parts of trioxane and 0.8 part of styrene, 0.003 part of cadmium tetrafluoroborate hexahydrate and 0.006 part of diphenyl dichloromethane were added and the mixture was reacted at 80° C. for 1 hour, whereby 35 parts of copolymer were obtained (yield: 87.5%). The intrinsic viscosity [η] and the rate of thermal decomposition [$K_{222}$] of the product were 1.90 and 0.9%/min., respectively. When the copolymer was treated with acetic anhydride in the presence of sodium acetate at 138° C. for 2 hours, the rate of thermal decomposition [$K_{222}$] of thus acetylated product changed to 0.26%/min. When the said acetylation was conducted in the presence of 0.5% by weight of diphenyl amine, the [$K_{222}$] value was 0.11%/min.

Example 13

To a mixture of 39.2 parts of trioxane and 0.8 part of styrene, 0.004 part of zinc tetrafluoroborate hexahydrate was added and the mixture was reacted at 80° C. for 3 hours. 35.4 parts of copolymer were obtained (yield: 88.4%). The intrinsic viscosity [η] and the rate of thermal decomposition [$K_{222}$] were 1.85 and 1.0%/min., respectively. This product was added with glycine powder in an amount of 1% by weight the total mixture, and the mixture was heated at 200° C. for 10 minutes, and then the mixture colored yellow. This mixture was dissolved in dimethyl formamide and cooled. The precipitated polymer was recovered and washed with water to obtain white powder, whose $K_{222}$ value was 0.28%/min. When thus treated product was added with 0.2%, by weight, of 4,4'-butylidene-bis(6-tert.butyl m-cresol), the $K_{222}$ value of the final product changed to 0.09%/min.

Example 14

To a mixture of 38.8 parts of trioxane and 1.2 parts of styrene, 0.004 part of magnesium tetrafluoroborate hexahydrate was added and the mixture was polymerized at 80° C. for 3 hours. 34.0 parts of copolymer were obtained (yield: 85.1%), whose [η] was 1.69 and $K_{222}$ was 1.1%/min. This product was placed in ethylene glycol containing 1% glycine and maintained at 130° C. for 1 hour, and thereafter washed and dried. When thus treated product was heated at 200° C. for 10 minutes, there occurred no coloration in this polymer. The $K_{222}$ value of the treated product was 0.3%/min.

Example 15

145 parts of trioxane and 140 parts of Crystol 355 (manufactured by Esso Standard Sekiyu K. K.; mixture of hydrocarbons having more than 21 carbon atoms) were placed in a reaction vessel equipped with stirrer and the mixture was stirred at 70° C., the speed of said stirring being 1000 r.p.m. To this reaction vessel, a suspension of 0.03 part of cadmium tetrafluoroborate hexhydrate and 0.06 part of triphenyl monochloromethane in a mixture of 6 parts of styrene and 10 parts of Crystol 355 were added, whereby the polymerization reaction began to start and the temperature increased up to 80° C. After 1 hour, the said stirring was stopped and thus produced polymer was washed with petroleum ether and then with methanol and dried in vacuum. 110 parts of copolymer were obtained (yield: 72.8%), whose intrinsic viscosity [η] was 1.86.

What we claim is:

1. A method for preparing trioxane copolymer comprising copolymerizing trioxane with at least one comonomer selected from the group consisting of styrene and norbornylene, characterized by employing at least one catalyst selected from the group consisting of copper tetrafluoroborate, magnesium tetrafluoroborate, zinc tetrafluoroborate, cadmium tetrafluoroborate, tin tetrafluoroborate, lead tetrafluoroborate, copper hexafluorosilicate, magnesium hexafluorosilicate, zinc hexafluorosilicate, cadmium hexafluorosilicate, tin hexafluorosilicate and lead hexafluorosilicate.

2. A method according to claim 1, wherein the said catalyst is employed in an amount of 0.001–1%, by weight, of monomer mixture.

3. A method according to claim 1, wherein 99.9–95 mole percent of the trioxane and 0.1–5 mole percent of the comonomer are copolymerized.

4. A method according to claim 1, wherein the said copolymerization is carried out at a temperature of 62°–116° C.

5. A method according to claim 1, wherein the said copolymerization is carried out further employing at least one co-catalyst selected from the group consisting of triphenyl monochloromethane and diphenyl dichloromethane in an amount of 0.1–10 times, by weight, the said catalyst.

6. A method according to claim 1, wherein the said copolymerization is carried out by the bulk polymerization process.

7. A method according to claim 1, wherein the said copolymerization is carried out by the suspension polymerization process with 0.5–5 times, by weight, the monomer mixture of suspension medium consisting of saturated aliphatic hydrocarbon having more than 21 carbon atoms.

8. A method for preparing trioxane copolymer comprising copolymerizing 99.9–95 mole percent of trioxane with 0.1–5 mole percent of at least one comonomer selected from the group consisting of styrene and norbornylene, characterized by employing at least one catalyst selected from the group consisting of copper tetrafluoroborate, magnesium tetrafluoroborate, zinc tetrafluoroborate, cadmium tetrafluoroborate, tin tetrafluoroborate, lead tetrafluoroborate, copper hexafluorosilicate, magnesium hexafluorosilicate, zinc hexafluorosilicate, cadmium hexafluorosilicate, tin hexafluorosilicate, and lead hexafluorosilicate in an amount of 0.001–1%, by weight, of the monomer mixture, and at least one co-cat alyst selected from the group consisting of triphenyl monochloromethane and diphenyl dichloromethane in an amount of 0.1–10 times, by weight, the said catalyst, and by conducting the bulk polymerization at a temperature of 65°–90° C.

9. A method according to claim 1, wherein the said catalyst is employed in the form of hexahydrate crystal.

10. A method for stabilizing the trioxane copolymer obtained by copolymerizing trioxane and at least one comonomer selected from the group consisting of styrene and norbornylene in the presence of at least one catalyst selected from the group consisting of copper tetrafluoroborate, magnesium tetrafluoroborate, zinc tetrafluoroborate, cadmium tetrafluoroborate, tin tetrafluoroborate, lead tetrafluoroborate, copper hexafluorosilicate, magnesium hexafluorosilicate, zinc hexafluorosilicate, cadmium hexafluorosilicate, tin hexafluorosilicate, and lead hexafluorosilicate, comprising acetylating the said copolymer with acetic anhydride.

11. A method according to claim 10, wherein the said acetylation effected in the presence of sodium acetate for the catalyst.

12. A method for stabilizing the trioxane copolymer obtained by copolymerizing 99.9–95 mole percent of trioxane with 0.1–5 mole percent of at least one comonomer selected from the group consisting of styrene and norbornylene at 65°–90° C. in the presence of at least one catalyst selected from the group consisting of copper tetrafluoroborate, magnesium tetrafluoroborate, zinc tetrafluoroborate, cadmium tetrafluorobzorate, in tetrafluoroborate, lead tetrafluoroborate, copper hexafluorosilicate, magnesium hexafluorosilicate, zinc hexafluorosilicate, cadmium hexafluorosilicate, tin hexafluorosilicate, and lead hexafluorosilicate in an amount of 0.001–1%, by weight, of the monomer mixture, and at least one co-catalyst selected from the group consisting of triphenyl monochloromethane and diphenyl dichloromethane in an amount of 0.1–10 times, by weight, the said catalyst, comprising acetylating the said copolymer with acetic anhydride in the presence of sodium acetate as a catalyst.

13. A method for stabilizing the trioxane copolymer obtained by copolymerizing trioxane with at least one comonomer selected from the group consisting of styrene and norbornylene in the presence of at least one catalyst selected from the group consisting of copper tetrafluoroborate, magnesium tetrafluoroborate, zinc tetrafluoroborate, cadmium tetrafluoroborate, tin tetrafluoroborate, lead tetrafluoroborate, copper hexafluorosilicate, magnesium hexafluorosilicate, zinc hexafluorosilicate, cadmium hexafluorosilicate, tin hexafluorosilicate, and lead hexafluorosilicate, comprising adding to the copolymer at least one neutral amino-acid selected from the group consisting of glycine, α-alanine, β-alanine and sarcosine in an amount of 0.1–3%, by weight, of the copolymer, and heating the mixture at a temperature above the melting point of said copolymer.

14. A method according to claim 13, wherein the said neutral amino acid is employed in the form of powder and directly added with said copolymer.

15. A method according to claim 13, wherein the said neutral amino acid and the copolymer are mixed in ethylene glycol heated at 120°–140° C.

16. A method for stabilizing the trioxane copolymer obtained by copolymerizing 99.9–95 mole percent of trioxane and 0.1–5 mole percent of at least one comonomer selected from the group consisting of styrene and norbornylene at 65°–90° C. in the presence of at least one catalyst selected from the group consisting of copper tetrafluoroborate, magnesium tetrafluoroborate, zinc tetrafluoroborate, cadmium tetrafluoroborate, tin tetrafluoroborate, lead tetrafluoroborate, copper hexafluorosilicate, magnesium hexafluorosilicate, zinc hexafluorosilicate, cadmium hexafluorosilicate, tin hexafluorosilicate, and lead hexafluorosilicate in an amount of 0.001–1%, by weight, of the monomer mixture, and at least one co-catalyst selected from the group consisting of triphenyl monochloromethane and diphenyl dichloromethane, in an amount of 0.1–10 times, by weight, the said catalyst, comprising adding to the copolymer at least one neutral amino acid selected from the group consisting of glycine, α-alanine, β-alanine, and sarcosine in an amount of 0.1–3%, by weight, of said copolymer, and heating the mixture at a temperature above the melting point of the said copolymer.

References Cited
UNITED STATES PATENTS

| | | |
|---|---|---|
| 3,110,700 | 11/1963 | Hopff et al. |
| 3,317,477 | 5/1967 | Wilson et al. _____ 260—73 |
| 3,344,120 | 9/1967 | Rosen _____ 260—73 |
| 3,357,953 | 12/1967 | Baumber. |

WILLIAM H. SHORT, *Primary Examiner.*

L. M. PHYNES, *Assistant Examiner.*

U.S. Cl. X.R.
260—45.9, 67, 73